J. B. Conger,
Water Wheel,
Nº 5,184.
Patented July 10, 1847.
Fig.1
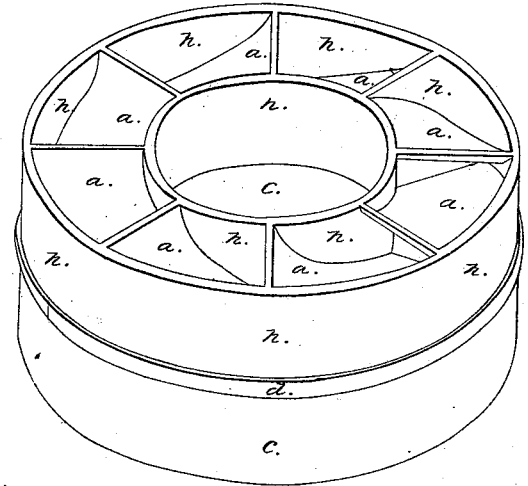
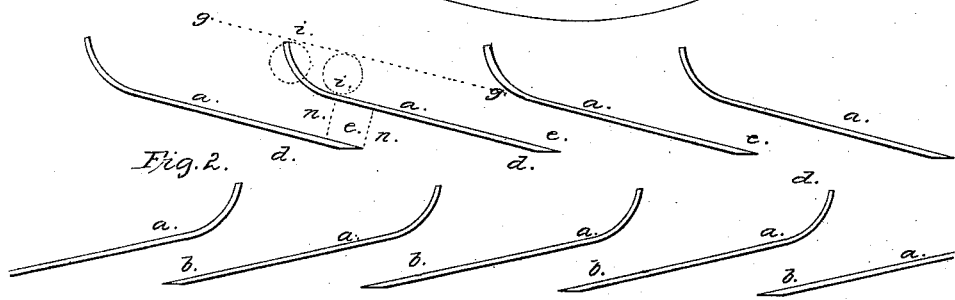
Fig.2.
Fig.3.
Fig.4.
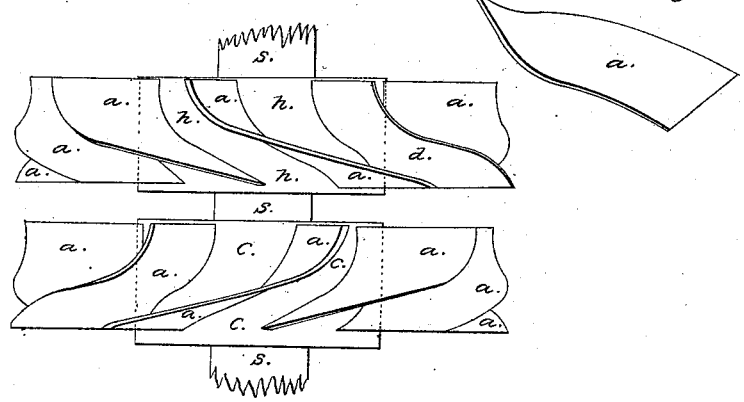
N. PETERS, PHOTO-LITHOGRAPHER, WASHINGTON, D. C.

UNITED STATES PATENT OFFICE.

JAMES B. CONGER, OF JACKSON, TENNESSEE.

IMPROVEMENT IN WATER-WHEELS.

Specification forming part of Letters Patent No. 5,184, dated July 10, 1847.

*To all whom it may concern:*

Be it known that I, JAMES B. CONGER, of the county of Madison and State of Tennessee, have invented a new and Improved Mode of Constructing and Applying the Water on Water-Wheels; and I do hereby declare that the following is a full and exact description.

The nature of my invention consists in so forming and arranging the buckets or vanes of the wheel and chutes that the water on entering through the chutes into a space between them and the wheel is given a direction and velocity similar to that of the wheel, and a contrary direction on leaving it, with equal velocity as relates to the wheel, but without actual velocity, thereby causing the wheel to stop the motion of the water entirely, at the same time that it (the wheel) has a velocity of rotation equal to 0.7, that of the water, if allowed to escape freely, being 1. Water when issuing out from under one-half the head will have a velocity equal to 0.7; that of the whole head being considered as 1; and if water pass through an aperture into an apartment from which it issues at an aperture of equal size, then the velocity at each aperture will be seven-tenths of that due the whole head, and the pressure of the water in the apartment will equal one-half that of the whole column of water. The force imparted in the direction of rotation by an invariable sluice of water impinging against or leaving a wheel is, to its actual force, as the cosine of the angle its direction forms with the plane or tangent of rotation is to radius.

It is known that when water issuing out at an aperture pierce through a thin plate will have its vane contracted after leaving the orifice, and that if it pass through a tube of equal size throughout its velocity will not be that assigned by theory; but if it issue out through a cone-shaped tube approaching in form the contraction of the vane, the velocity and quantity discharged will be very nearly that assigned by theory. These several principles I take into consideration in the construction of my wheel.

The curve and arrangement of the buckets or vanes of my wheel are somewhat different from that of other wheels. That part of the bucket where the water leaves them is plane, in order that the water may move when entering the wheel in a direction as near as may be with it and in an opposite one when leaving it. That part of the bucket where the water enters is cycloidal, which is the best form of ajutage. The water may be let in at or issue from the inside, outside, top, or bottom of the wheel. It may be let on by one single chute or by any number. The shaft may be placed in any position from horizontal to vertical, and any number of wheels may be placed on it.

To enable others skilled in the art to make and use my invention, I will proceed to describe its construction and operation.

I construct my water-wheel and apply the water on it in any of the known forms, and have gates, penstock, and other appendages, and apply it to drive any machinery in any of the known ways that it is usually driven by such wheels; but in order to obtain the greatest possible effect that water is capable of producing I make the area of the cross-section of the chute, or of all the chutes by which the water is let on the wheel equal to that of all the issues at which it leaves it, and form the buckets so that the top or part where the water enters is the cusp of a cycloid, and the bottom or part where the water leaves is a tangent to its vertex and does not form an angle of more than fifteen degrees with the plane of rotation of the wheel.

The wheel that I conceive to be most convenient bears some resemblance in its general form to the tub in common use, which may be made of cast-iron or any other suitable material, either of one or more pieces. It has two concentric rings, (see Fig. 1, $h\,h$, &c., of the chutes similar to the wheel,) between which are a suitable number of buckets to form issues of a proper size dependent on the height of the head of water used and the business to be done. The top part of the buckets is cycloidal, and that part where the water leaves the wheel is plane except a wind to suit the curve of the wheel, which wind is such that the top and bottom and all the horizontal sections of the buckets are radial to the center of rotation of the wheel. The plane part of each bucket extends or laps past the point of the next as far as they are distant from each other at that place. (See $n\,n$, Fig. 2.) From the plane part to the top the buckets have a cycloidal curve formed by rolling a circle on a line parallel to the plane part of the buckets. (See *i i g g*, Fig. 2.) The diameter of the circle should be equal to the distance of the buckets apart at the nearest point, (or the line on which the circle is rolled should be a continuation at the plane part of the next bucket,) (see *g g*, Fig. 2.) The plane part should form a tangent to the vertex of the cycloidal part. The outer rim of the wheel should extend some distance above the buckets, which should be larger than the part that contains the buckets. This wheel is placed on a suitable shaft and step and another wheel precisely similar (except that the buckets slant in a contrary direction and that the rim does not extend above them) is placed permanently above it in the floor of the penstock. The lower one turns and is called the "wheel." The upper one is permanent and is called the "chutes." (See Figs. 1 and 3.) The shaft of the wheel turns freely in the center of the chutes, and fits so close as to prevent the escape of water. The lower part of the rim of the chutes fits in the extended part of that of the wheel, so as to prevent the escape of water. (See *d*, Fig. 1.)

The water is let into the penstock and stands with the whole height of head above the chutes and passes through them into the space between them and the wheel, and then out at the issues of the wheel with a velocity at each equal to seven-tenths of that due the whole head.

To produce a maximum effect, the chutes and issues of the wheel should be of equal size and the wheel move with the same velocity of the water.

Figure 1 represents the wheel and chutes in position without shaft or any other appendages. *a a*, &c., are the buckets or vanes and *h h*, &c., the two rims of the chutes; *c c*, the inner and outer rim of the wheel; *d*, that part of the rim of the wheel that overlaps the chutes.

Fig. 2 is a diagram that shows the position of the buckets of the wheel and chutes. The dotted line *g g* is that on which the circle *i* is rolled to form the cycloidal part of the bucket. *b b*, &c., are the issues of the wheel; *e e*, &c., those of the chutes; *a a*, &c., the buckets of the chutes and wheel; *d d d*, the space between the wheel and chutes; *n n*, the lap of the plane part of the buckets.

Fig. 3 is an elevation of the wheel and chutes with the outer rims taken off to show the position of the buckets; *a a*, &c., the buckets; *c c c*, the center ring of the wheel; *h h h*, the center ring of chutes; *s s s*, parts of shaft; *d d*, the space between wheel and chute.

Fig. 4 is a bucket in perspective.

What I claim as my invention, and desire to secure by Letters Patent, is—

Constructing a wheel and chutes having buckets or vanes with the top part cycloidal and the bottom part plane placed between two concentric rings, using one-half of the cycloid, or nearly so, commencing at or near the cusp for the top of the bucket and making the plane part a tangent to the vertex, as herein described and set forth.

J. B. CONGER.

Witnesses:
J. R. CHAPPELL,
O. D. FITZGERALD.